US007022163B2

(12) United States Patent
Olsson et al.

(10) Patent No.: US 7,022,163 B2
(45) Date of Patent: Apr. 4, 2006

(54) METHOD OF TREATING AIR ON BOARD ON A VEHICLE, AND A DEVICE FOR USE WHEN PERFORMING THE METHOD

(75) Inventors: Mats Olsson, Staffanstorp (SE); Mats-Örjan Pogén, Billeberga (SE); Ingvar Hällgren, Tumba (SE); Roland Isaksson, Grödinge (SE); Stefan Szepessy, Huddinge (SE)

(73) Assignee: Alfa Laval Corporate AB, Lund (SE)

( * ) Notice: Subject to any disclaimer, the term of this patent is extended or adjusted under 35 U.S.C. 154(b) by 85 days.

(21) Appl. No.: 10/778,624

(22) Filed: Feb. 13, 2004

(65) Prior Publication Data
US 2004/0226442 A1    Nov. 18, 2004

(30) Foreign Application Priority Data
Feb. 17, 2003    (SE)    ..................... 0300410

(51) Int. Cl.
*B01D 45/14*    (2006.01)
*B01D 50/00*    (2006.01)

(52) U.S. Cl. ............................ 95/268; 95/270; 55/315; 55/406; 55/DIG. 17

(58) Field of Classification Search .................. 55/337, 55/315, 318, 400, 406, DIG. 17; 95/270, 95/268
See application file for complete search history.

(56) References Cited

U.S. PATENT DOCUMENTS

| | | | | | |
|---|---|---|---|---|---|
| 3,708,959 | A | * | 1/1973 | Soumerai et al. | ............. 95/268 |
| 3,955,945 | A | * | 5/1976 | Bauer | ......................... 55/319 |
| 6,755,896 | B1 | * | 6/2004 | Szepessy et al. | ............. 95/270 |

FOREIGN PATENT DOCUMENTS

| EP | 0 766 988 A1 | 4/1997 |
|---|---|---|
| EP | 1 229 248 A2 | 8/2002 |
| FR | 2 551 143 | 3/1985 |
| RU | 2043138 C1 | 9/1995 |

* cited by examiner

*Primary Examiner*—Robert A. Hopkins
(74) *Attorney, Agent, or Firm*—Michaud-Duffy Group LLP

(57) ABSTRACT

In a vehicle air is compressed for being used in the brake system of the vehicle, for instance. In the compressor, used for the compression, the air is contaminated with oil and solid particles. In order to be relieved from these particles, before the air is conveyed through a drying filter, the compressed is brought to rotation by means of a rotating member in a centrifugal separator. The rotating member may advantageously include a pile of conical separation discs forming flow passages between each other for the compressed air to be cleaned. By means of an efficient cleaning of the compressed air from particles the life time of the drying filter may be increased.

20 Claims, 1 Drawing Sheet

METHOD OF TREATING AIR ON BOARD ON A VEHICLE, AND A DEVICE FOR USE WHEN PERFORMING THE METHOD

CROSS-REFERENCE TO RELATED APPLICATIONS

This application is entitled to the benefit of and incorporates by reference essential subject matter disclosed in Swedish Patent Application No. 0300410-8 filed on Feb. 17, 2003.

BACKGROUND OF THE INVENTION

On board on a vehicle, such as a truck, a bus or a working vehicle, air for use in for instance the brake system and/or the wheel suspension system of the vehicle is compressed. For pressurizing the air a compressor is used, which frequently is lubricated with oil of the same kind that is used for the lubrication of the engine by which the vehicle is driven. The compressor is driven by means of said engine and supplies intermittently, when so needed, compressed air to one or several overpressure containers in the vehicle. From these containers, compressed air is delivered to for instance the brake system of the vehicle when so required.

Compressed air produced in this manner contains suspended particles of oil, water and a plurality of solid particles including hydrocarbon compounds. The solid particles are formed as a consequence of a relatively high temperature in the compressor. In order to be able to use the brake system and the suspension system of the vehicle the compressed air has to be relieved from on one hand the main part of the particles and on the other hand from vaporised water.

Traditionally, compressed air, which is produced on board on a vehicle, is cleaned by being brought to pass through a filter. In the filter, the plurality of solid and liquid particles are caught, but also vaporised water is separated in a part of the filter, which includes a bed of material especially intended for this purpose. Usually, the compressed air is cooled before it is cleaned so that certain of the vaporised substances are condensed. In certain cases the cooled compressed air is also brought to pass through a so-called pre-separator, for instance a cyclone, for being relieved from the largest of the suspended particles.

For reconditioning of the filter, the latter is back-flushed intermittently with a part of the compressed air that has passed through the filter, wherein a filtrate and moisture absorbed in the filter is removed from the filter and conveyed out of the compressed air system of the vehicle.

In spite of a repeated reconditioning of the filter material, this has to be replaced after a certain operational time period since it is clogged by oil and solid particles which can not be removed completely by the back-flushing with cleaned compressed air. Since the filter material is relatively expensive, it is desirable to replace the same as seldom as possible. Furthermore, it is also an evident desire to reduce further costs for the replacement of the filter bed.

SUMMARY OF THE INVENTION

The object of the present invention is to prolong the lifetime of such, filter material, primarily intended for drying compressed air to be used on board on a vehicle.

This object may be achieved according to the invention in such a way that the compressed air, prior to being conveyed to a drying filter, is relieved from particles suspended therein by being brought to rotate in a separation chamber by means of a rotating member. By means of rotating member the compressed air may in an easy manner be brought to such a powerful rotation that the air is substantially completely relieved from said suspended particles. Since substantially all solid hydrocarbon particles and oil particles may be separated from the air, before it is conveyed through the drying filter, the time period for clogging of the drying filter may be significantly prolonged.

By using a rotating member for the rotation of the compressed air, the cleaning of the air may also be efficient at relatively low flow velocities of the air when it flows from the compressor to the compressed air container of the vehicle. When cleaning compressed air in a cyclone, the cleaning effect is strongly reduced during periods when the flow velocity of the compressed air is low. This occurs, for instance, at the end of each period when the compressor delivers new compressed air to the super pressure containers of the vehicle, since the pressure in these container increases successively during each such period. Especially for certain kinds of vehicles, for instance buses in urban transport, at which the consumption of compressed air is large, such a reduced cleaning effect may have a great significance since the periods when the compressor delivers new compressed air is repeated very frequently, for instance with intervals in the order of 30 seconds.

Within the scope of the invention, the rotating member may be provided in a space delimited by a stationary container, wherein the compressed air to be cleaned is brought to pass through and rotate in a thin interspace between the rotating member and a stationary wall surrounding the rotating member. The most efficient possible separation may, however, be achieved according to the invention if the compressed air to be cleaned, is conveyed through at least one chamber, which is delimited within the rotating member and which in such a case constitutes said separation chamber. The suspended particles are hereby separated from the compressed air in the separation chamber within the rotating member, whereafter they may be conveyed out through openings in the walls of the rotating member to a surrounding space having stationary peripheral walls. The separated particles, which at least partly have been constituted by liquid droplets and after the separation from the compressed air may have coalesced and formed a liquid or a liquid suspension, are conveyed further out from the surrounding space through a particle outlet by means of an overpressure which is maintained for the air in the space. To this end, an intermittently openable valve, for instance, or a continuously of discontinuously operating locking device, may be used in the particle outlet.

The compressed air relieved from particles may either be conveyed out, preferably axially, from the rotating member directly to a receiving vessel or a pipe or be conveyed out into said space around the rotating member and from there be conveyed further to a pipe or any other receiving vessel.

The rotating member may be brought to and maintained in a rotating state by any suitable aids. Preferably, an electric motor is used for this purpose. Possible, also a gas or liquid turbine—reaction or impulse turbine—may be arranged for such operation. As already indicated, a drive source, the drive force of which is independent of the speed by which the compressed air to be cleaned flows between the compressor and a receiving overpressure container in the vehicle, is used. If a gas turbine is used therefor, the propelling air therefor should be other compressed air than the one which is to be conveyed to the rotating member for being cleaned.

When circumstances so permit, the rotating member does not need to be kept in a rotating state during the whole time when the vehicle is in operation. It may be sufficient if the rotation is maintained during periods when the compressor delivers compressed air to the overpressure container of the vehicle. In particular, if the rotation is obtained by means of an electric motor it may be quickly started when so required. If the compressor is kept in operation continuously and a closing valve is opened, when new compressed air is to be supplied to an overpressure container in the vehicle, the rotating member may be brought to rotation at the same time as such a closing valve is opened. If the compressor is not kept in operation, when it is not needed, the rotating member may be brought into rotation at the same time as the compressor once again is started.

As has been mentioned already, the rotating member may be designed in many different ways. Preferably, it includes a pile of thin conical separation discs, which between themselves delimit passages for a throughflow of the compressed air to be clean. The compressed air may be conveyed through such passages either in a direction towards or in a direction away from the rotary axis of the rotating member. If so desired, the rotating member may include per se a wall, which completely surrounds the pile of separation discs, but suitably said passages communicate directly with a space in which the rotating member is rotating and which is surrounded by stationary walls. In such a case, particles which in the interspaces between the separation discs have been separated from the compressed air, are thrown directly out into said space, from where they may be removed in any suitable manner without the need of reducing the air pressure in the space.

Instead of conical separation discs, the rotating member may include separation discs, which are distributed around said rotary axis and which each extends both axially and away from the rotary axis. The extension of the discs away from the rotary axis may be either radial or for instance curved. In this case, the separation discs form channels, which run through the rotating member and through which the compressed air is conveyed when it is brought to rotation around said rotary axis. Adjacent plane or curved separation discs of this kind are suitably arranged so dose to each other and form suitably such an angle to each other that the axial channels between the discs becomes very thin. In other words a particle, which by the centrifugal force is moving radially outwardly in such a channel, should hit one of the separation discs already after having moved a very short radial distance.

The invention also refers to a particular device for use when performing the method described above from treating air on board on a vehicle. The device, which is defined in the following claims, is designed in such a way that gives the device a very compact construction and enables an inexpensive manufacturing of the device. Consequently, the device includes a stationary housing, a centrifuge rotor rotatable in the housing and an electrical motor for rotating the centrifuge rotor around a rotary axis. The centrifuge rotor is journalled in the housing via bearings located merely at two bearing locations at an axial distance from each other, and delimits a plurality of passage for throughflow of compressed air to be clean. The electrical motor includes a stator, which is connected to the housing, and a rotor, which is constituted of a part of the centrifuge rotor and which is journalled in relation to the stator merely via said two bearings. The motor is thus no standard motor with bearings of its own but uses the bearings that the centrifuge rotor needs for its rotation. Thanks to the integration of the centrifuge rotor and the electrical motor, the whole cleaning device becomes compact.

BRIEF DESCRIPTION OF THE DRAWINGS

The invention is described in the following with reference to the attached drawing.

DETAILED DESCRIPTION OF THE PREFERRED EMBODIMENTS

Figure 1:
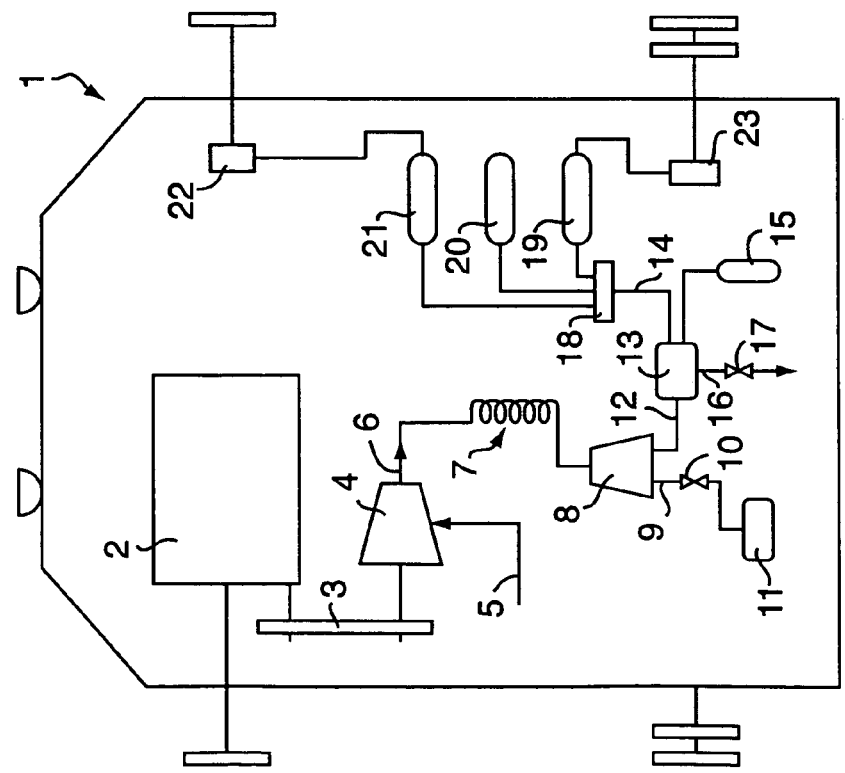
FIG. 1 illustrates a compressed air system on board on a vehicle.

FIG. 1 illustrates schematically a vehicle 1 having a combustion engine 2 arranged for propelling the vehicle. Via a transmission 3, the engine 1 is arranged to drive an air compressor 4. Air of atmospheric pressure is entering the compressor 4 through a first conduit 5 and compressed air is leaving the compressor through a second conduit 6.

At its passage through the compressor 4, the air is supplied with particles of oil from the lubrication system (not disclosed) of the compressor. At the same time some steam, which follows the air into the compressor, is condensed to water droplets, which as the oil particles remain suspended in the compressed air. Finally, some oil droplets are converted, as a consequence of a relatively high temperature in the compressor, to solid hydrocarbon particles, which also follow the compressed air out of the compressor.

The compressed air is brought to flow through a cooler 7, in which a main part of oil vaporised in the air and a part of steam are condensed to liquid droplets, which follow the compressed air further out of the cooler.

The cooled compressed air and the oil and water droplets suspended therein, and remaining steam, are conveyed further through the conduit 6 and into a centrifugal separator 8 including a centrifuge rotor by means of which the air is brought into a powerful rotation (the centrifugal separator is described more in detail in the following with reference to FIG. 2). In the centrifugal separator 8, the compressed air is relieved from solid and liquid particles, which in form of a liquid suspension/emulsion leave the centrifugal separator at the lower part thereof through a conduit 9. In the conduit 9, a closing valve 10 is provided, which is arranged to open and to be kept open during short time periods for letting out said suspension/emulsion from the inner pressurised space of the centrifugal separator. The suspension/emulsion flows further to a collecting container 11.

Compressed air relieved from particles leave the centrifugal separator 8 via a conduit 12, which opens up in a drying device 13 of a conventional kind. The drying device 13 includes a bed of particles (granulate), which are especially prepared for adsorbing vaporised water or possibly remaining traces of vaporised oil. Relieved from such water and possible oil, the compressed air is conveyed further to a conduit 14.

A small part of the air relieved from particles is conveyed into a so-called cleaning air container 15, in which it is retained under overpressure. During short interruptions in the production of compressed air by the compressor 4, air, which is retained in the cleaning air container 15, is returned through the drying device 13 and brought to leave the drying device 13 via a conduit 16 provided with a closing valve 17.

The back-flow of air from the cleaning air container 15 is achieved by opening the valve 17 during a short period of time. A back-flow process of this kind is well known in a compressed air system of this kind, and thus it is not described more closely in this context.

The compressed air, which is relieved from particles as well as steam, is conveyed further to a valve unit 18 in which it is distributed after need via different conduits to different storing containers 19, 20, 21. From these containers the air is then conveyed further to various parts of the vehicle for being used for different needs. As illustrated in FIG. 1, two of the containers (19 and 21) are intended for compressed air to be used in the brake system of the vehicle. Two wheel brakes 22 and 23 are disclosed schematically.

If so desired, the suspension/emulsion which leaves the centrifugal separator 8, may be supplied to a special liquid separator (not disclosed) which is arranged to separate the oil from the water and possible solid particles. If the oil is of the same kind as the lubrication oil in the combustion engine 2, it may continuously or batchwise be supplied to the lubricating system of the combustion engine while the water and possible particles are collected in the container 11. The oil separation proper may be performed intermittently or continuously during the operation of the compressor. For the oil separation a so-called static lamella separator, for instance located in the container 11 or a small centrifugal separator of any kind, may be used.

Figure 2:
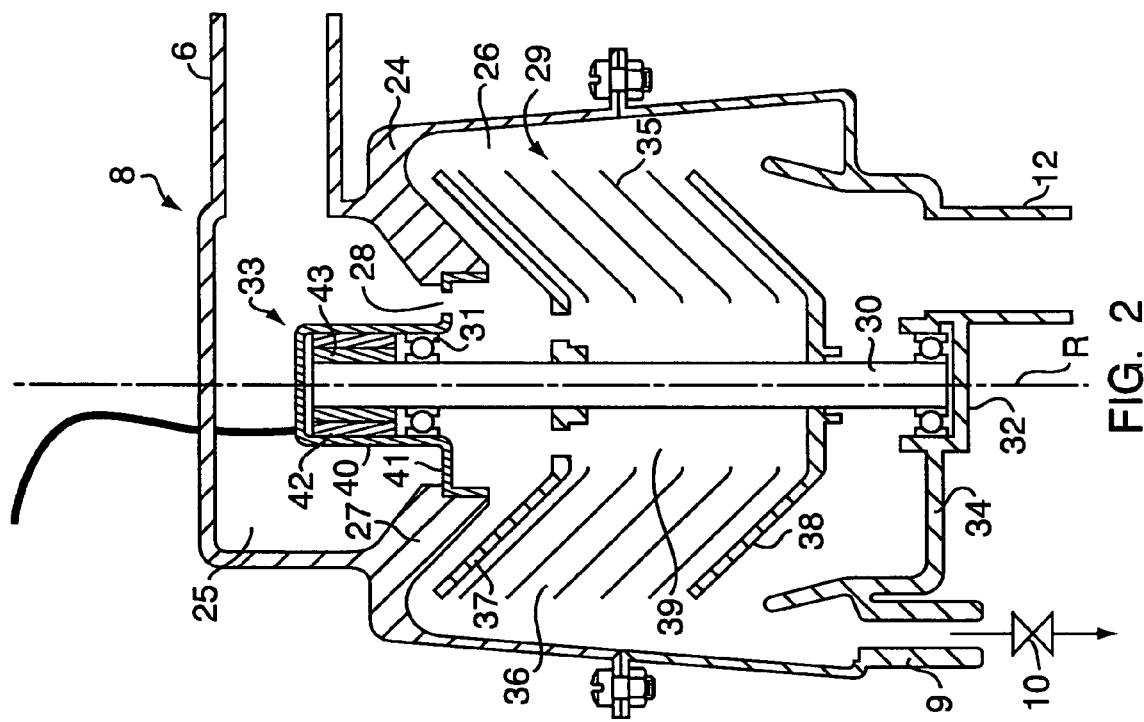
FIG. 2 schematically discloses a device in the compressed air system for relieving compressed air from particles suspended therein, such as solid hydrocarbon particles, and oil and water particles.

The centrifugal separator 8 mentioned above for relieving compressed air from particles is schematically disclosed in a longitudinal section in FIG. 2.

The centrifugal separator 8 includes a stationary (non-rotatable) housing 24. The above-mentioned conduit 6, via which compressed and cooled air is supplied from the cooler 7 (FIG. 1), is connected to the upper part of the housing 24, and the above-mentioned outlet conduits 9 and 12 for separated particles and cleaned air, respectively, are connected to the lower part of the housing 24.

The housing 24 delimits in its upper part an inlet chamber 25 and in its lower part a separation chamber 26. The chambers 25 and 26 are separated by an intermediate wall 27, but communicate with each other via a plurality of openings 28 through the intermediate wall 27. A centrifuge rotor 29 is rotatable in the separation chamber 26 around a vertical rotary axis R. The centrifuge rotor has a central support shaft, which is rotatably supported by two bearings 31 and 32 at its upper and lower ends, respectively. The upper bearing 31 is carried by a cover 33, which constitutes a part of said intermediate wall 27 and which has said openings 28. The lower bearing 32 is carried by a lower end wall 34 of the housing 24. Both the bearings 31 and 32 are thus provided within the housing 24 in which an over atmospheric pressure prevails during the operation of the centrifugal separator.

The support shaft 33 carries in the separation chamber 26 a pile of conical separation discs 35 provided co-axially with the rotary axis R and delimiting between themselves thin passages 26 for a through-flow of compressed air to be cleaned from particles. Distance members (not disclosed) between the separation discs keep these at a distance of for instance 1 mm from each other. The uppermost and the lowermost separation disc 37 and 38, respectively, is somewhat thicker than the remaining discs and keep the pile of separation discs together, for instance by means of axial rods (not disclosed) that extend through holes in all of the discs.

All of the discs, except the lowermost one 38, have a plurality of throughgoing holes distributed around the central support shaft 30. These holes and the interspaces between the central parts of the conical separation discs form a central space 39 within the rotor. This space 39 communicates on one hand with said inlet chamber 25 in the upper part of the housing, via the openings in the intermediate wall 27, 33 of the housing, and on the other hand with the radially inner parts of all of the passages 36 between the separation discs. The radially outer parts of the passages 36 communicate with a space, which surrounds the centrifuge rotor 29 in the housing 24 and which in turn communicates with the outlet conduit 9 for separated particles as well as the outlet conduit 12 for clean air.

Said cover 33, which constitutes a part of the intermediate wall 27, has a substantially cylindrical part 40 and a surrounding plane part 41 connected to the cylindrical part 40. The cylindrical part 40 of the cover surrounds an upper portion of the central support shaft 30 of the centrifuge rotor, and carries on its inner side a stator 42 of an electric motor. A rotor 43 associated with the same motor is carried by said upper portion of the central support shaft 30 radially inside the stator 42. An electric conduit 44 extends from outside through the outer wall of the housing 24 and through the cover 33 into the stator 42 of the motor.

As has been described not only the centrifuge rotor 29 and its bearings 31 and 32 but also the electrical motor 42, 43 are provided within the housing 24, in which an over atmospheric pressure is intended to prevail during operation of the centrifugal separator 8. No possibilities for leakage of compressed air is thus present along the drive and support shaft 30 of the centrifuge rotor.

A centrifuge rotor of the kind described may be manufactured substantially in plastics and thus becomes very light. An electrical motor of the kind described and integrated with the centrifuge rotor does then not need to be particularly heavy for being able to bring quickly the rotor to the required rotation. The electric motor may in principle be of any suitable kind, for instance a direct current motor or an alternating current motor (synchronous motor or asynchronous motor). Preferably a synchronous motor is used, the rotor of which includes permanent magnets.

The centrifugal separator disclosed in FIG. 2 operates in the following manner.

When the centrifuge rotor 29 rotates around its rotary axis R compressed air to be cleaned is supplied via the conduit 6 into the receiving chamber 25 and is conveyed further through the openings 28 into the separation chamber 26. It is conveyed directly into the central chamber 39 of the centrifuge rotor and from there to the different passages 36 between the conical separation discs 35.

The incoming compressed air is brought to rotation by the centrifuge rotor and is pumped therethrough from the central chamber 39 via the passages 36 out into the part of the separation chamber 26, which surrounds the centrifuge rotor 29. In the passages, such particles of oil, water and solid substances, which are suspended in the air, are separated from the air by centrifugal forces by being thrown towards and deposited onto the inner sides of the conical separation discs 35. On this inner sides of the separation discs, the particles are moving as a consequence of the centrifugal forces further radially outwardly until they reach the peripheral edges of the discs from which they are thrown towards and deposited on the peripheral wall of the housing 24. From there the particles are flowing in the form of a liquid suspension downwardly and through the outlet conduit 9.

In order to avoid that cleaned compressed air in the area around the centrifuge rotor 29 will flow back radially inwardly in the space between the uppermost conical disc 37 and the intermediate wall 27 of the housing 24, and being remixed with non-cleaned compressed air, said space should be made as small as possible. Possibly a sealing member may be provided in any part of this space, which however is not necessary since a certain small flow of compressed air through this space is not of any serious significance.

Cleaned compressed air is conveyed out of the separation chamber 26 through the outlet conduit 12.

What is claimed is:

1. A method of treating air on board on a vehicle, before the air is used in compressed form in the vehicle, wherein the air in a first step is compressed by means of a compressor, which for the purpose of its operation is supplied with lubricating oil, thereafter is conveyed through a particle separator, and finally relieved from vaporised water by means of a filter,
wherein, the compressed air in said particle separator is relieved from lubricating oil accompanying the air from the compressor by being rotated in a separation chamber by means of a rotating member, said rotating member comprising separation discs that form a plurality of interspaces through which said compressed air relieved from said particles is conveyed.

2. A method according to claim 1, wherein the rotating member is kept in a rotating state in a space surrounded by stationary walls, in which an overatmospheric pressure is maintained and which is arranged to collect particles, that has been separated from the compressed air, wherein the collected particles are conveyed out of said space via a particle outlet while maintaining compressed air in the space.

3. A method according to claim 2, wherein the collected particles are conveyed from said space via an intermittently openable valve.

4. A method according to claim 1, wherein compressed air, to be relieved from particles, is conveyed through at least one chamber, which is delimited within the rotating member and which constitutes said separation chamber.

5. A method according to claim 4, wherein the rotating member is kept in a rotating state in a space, which is surrounded by stationary walls and in which an overatmospheric pressure is maintained, and compressed air, which has been relieved from particles in the separation chamber, is conveyed from the separation chamber to a non-rotating receiving vessel without being brought to flow through said space around the rotating member.

6. A method according to claim 5, wherein particles, which have been separated from compressed air in the separation chamber, are conveyed out from the chamber to said space around the rotating member and out from this space through a particle outlet while maintaining compressed air in the space.

7. A method according to claim 6, wherein the particles are conveyed from said space via an intermittently openable valve.

8. A method according to claim 4, wherein the rotating member is kept in a rotating state in a space surrounded by stationary walls, in which an overatmospheric pressure is maintained, and compressed air, which has been relieved from particles in the separation chamber, is conveyed from the chamber to said space and out from this space through an air outlet.

9. A method according to claim 8, wherein particles, which have been separated from compressed air in the separation chamber, are conveyed from the chamber to said space and out from this space through a particle outlet while maintaining compressed air in the space.

10. A method according to claim 9, wherein the particles are conveyed from said space via an intermittently openable valve.

11. A method according to claim 4, wherein said separation disks are conical in shape and stacked coaxially on each other, said separation disks constituting at least a part of the rotating member.

12. A method according to claim 11, wherein the compressed air is brought to flow through said interspaces in a direction away from the rotary axis (R) of the rotating member.

13. A method according to claim 12, wherein the rotating member is kept in a rotating state in a space surrounded by stationary walls and that the compressed air is conveyed into a central position in the rotating member, further conveyed through said interspaces and thereafter is conveyed out and into said space around the rotating member.

14. A device for use when performing the method according to claim 8 for cleaning compressed air on board on a vehicle from suspended particles, solid and/or liquid, therein,
wherein the device includes a stationary housing, a centrifuge rotor rotatable in the housing and an electrical motor for rotating the centrifuge rotor around a rotary axis (R),
wherein the centrifuge rotor is journalled in the housing via bearings located at merely two bearing locations at an axial distance from each other and
wherein the centrifuge rotor comprises a plurality of separation disks that delimit a plurality of passages for through flow of the compressed air to be cleaned, and
wherein the electrical motor includes a stator, which is connected to the housing, a rotor, which is constituted by a part of said centrifuge rotor and which is journalled in relation to the stator merely via said bearings.

15. A device according to claim 14, wherein at least the main part of the centrifuge rotor is provided axially between said two bearing locations.

16. A device according to claim 15, wherein the rotor of the electrical motor is located on one side and at least the main part of the centrifuge rotor is located on the other side of one of said bearing locations.

17. A device according to claim 14, wherein the centrifuge rotor is journalled for rotation around a substantially vertical rotary axis (R).

18. A device according to claim 14, wherein the centrifuge rotor includes a stack of separation disks, each of said disks being conical in shape and being arranged coaxially with said rotary axis (R).

19. A device according to claim 14, wherein said bearings at both the bearing locations are provided within the housing.

20. A device according to claim 14, wherein said bearings as well as said electrical motor are provided within the housing.

* * * * *

UNITED STATES PATENT AND TRADEMARK OFFICE
CERTIFICATE OF CORRECTION

| | | |
|---|---|---|
| PATENT NO. | : 7,022,163 B2 | Page 1 of 1 |
| APPLICATION NO. | : 10/778624 | |
| DATED | : April 4, 2006 | |
| INVENTOR(S) | : Mats Olsson et al. | |

It is certified that error appears in the above-identified patent and that said Letters Patent is hereby corrected as shown below:

On The Title Page, Item (73)

IN THE ASSIGNEE:

Please add --Haldex Brake Products AB, Landskrona (SE)--.

Signed and Sealed this

Seventeenth Day of April, 2007

JON W. DUDAS
*Director of the United States Patent and Trademark Office*